(12) United States Patent
Kiiveri et al.

(10) Patent No.: US 7,630,495 B2
(45) Date of Patent: Dec. 8, 2009

(54) METHOD FOR PROTECTING ELECTRONIC DEVICE, AND ELECTRONIC DEVICE

(75) Inventors: Antti Kiiveri, Oulu (FI); Nadarajah Asokan, Espoo (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1175 days.

(21) Appl. No.: 10/186,222

(22) Filed: Jun. 28, 2002

(65) Prior Publication Data

US 2003/0021413 A1 Jan. 30, 2003

(30) Foreign Application Priority Data

Jun. 29, 2001 (FI) .................................. 20011417

(51) Int. Cl.
*H04K 1/00* (2006.01)
(52) U.S. Cl. ....................... 380/247; 713/170; 380/277; 455/410
(58) Field of Classification Search ................. 713/170; 380/201–203, 247; 455/418
See application file for complete search history.

(56) References Cited

U.S. PATENT DOCUMENTS

| 5,224,166 | A | * | 6/1993 | Hartman, Jr. ................. 713/190 |
| 5,864,757 | A | * | 1/1999 | Parker ......................... 455/418 |
| 5,870,474 | A | * | 2/1999 | Wasilewski et al. .......... 380/211 |
| 6,047,071 | A | * | 4/2000 | Shah ............................ 380/273 |
| 6,112,305 | A | * | 8/2000 | Dancs et al. ................. 713/156 |
| 6,124,799 | A | * | 9/2000 | Parker ......................... 340/5.85 |
| 6,148,401 | A | * | 11/2000 | Devanbu et al. ............. 713/170 |
| 6,173,172 | B1 | * | 1/2001 | Masuda et al. .............. 455/410 |
| 6,314,283 | B1 | * | 11/2001 | Fielden ........................ 455/411 |
| 6,367,014 | B1 | * | 4/2002 | Proust et al. ................ 713/182 |
| 6,463,534 | B1 | * | 10/2002 | Geiger et al. ................ 713/168 |
| 6,570,488 | B2 | * | 5/2003 | Kucharczyk et al. ......... 340/5.2 |
| 6,826,690 | B1 | * | 11/2004 | Hind et al. .................. 713/186 |
| 6,975,202 | B1 | * | 12/2005 | Rodriguez et al. ......... 340/5.25 |
| 6,983,368 | B2 | * | 1/2006 | Wheeler et al. ............. 713/170 |
| 7,054,613 | B2 | * | 5/2006 | Smeets ........................ 455/410 |
| 7,123,721 | B2 | * | 10/2006 | Panjwani et al. ............ 380/270 |

\* cited by examiner

*Primary Examiner*—Nasser G Moazzami
*Assistant Examiner*—Fikremariam Yalew
(74) *Attorney, Agent, or Firm*—Hollingsworth & Funk, LLC

(57) ABSTRACT

Identity data of an operational unit and a verification key of the cryptographic method employed by the service provider are protected with a key of the cryptographic method employed by the manufacturer of the operational unit. The verification key of the cryptographic method employed by the manufacturer of the operational unit is stored in the operational unit of the electronic device. The identity data of the operational unit and the identity data of the service provider are protected with a key of the cryptographic method employed by the service provider. The identity data of the operational unit and the verification key of the service provider are verified with the verification key of the manufacturer of the operational unit. The identity data of the operational unit and the identity data of the service provider are verified with the verified verification key of the service provider. The identity data stored in the user-specific module are compared with the verified identity data. The device starts if the identity data verified by the cryptographic method correspond with the identity data stored in the user-specific module.

37 Claims, 4 Drawing Sheets

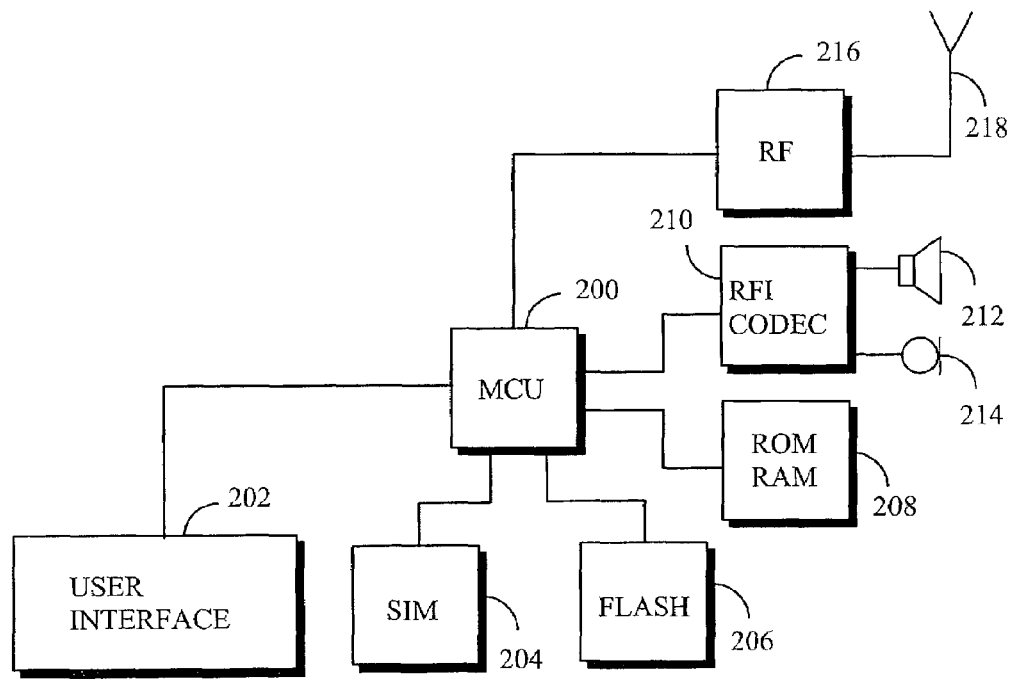
FIG. 3
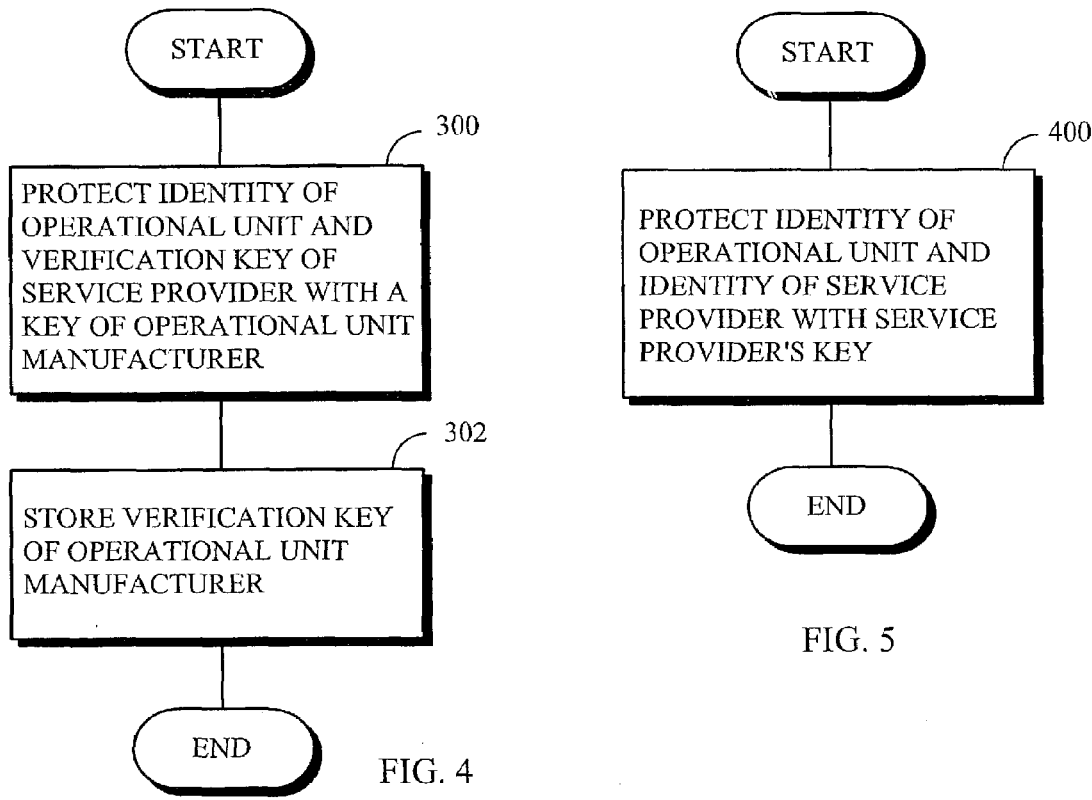

METHOD FOR PROTECTING ELECTRONIC DEVICE, AND ELECTRONIC DEVICE

FIELD OF THE INVENTION

The invention relates to a method for protecting an electronic device.

BACKGROUND OF THE INVENTION

A terminal in a radio system comprises a mobile equipment as an operational unit and a SIM module as a user-specific module, of which the mobile equipment comprises parts required for handling, transmitting and receiving a signal. The SIM module, in turn, comprises a processor and memory resources for processing and storing user data and user interface data.

The mobile equipment and the SIM module can be made mutually compatible such that a particular, single mobile equipment only works with a particular, single SIM module. So, when the mobile equipment is switched on, it locks by means of software to a correct SIM module attached to said mobile equipment. The operator of the user interface for making and receiving calls is determined in the SIM module. This is the case, for instance, when, in connection with the user interface purchase, the operator wishes to provide the user with a mobile equipment that is only usable for calls from the user interface in question. Because the user interface data is stored in the SIM module, it is possible to prevent the mobile equipment from being used with another SIM module, for instance, in another operator's network, by preventing the operation of the mobile equipment if an inappropriate SIM module is attached to the mobile equipment. Therefore, the mobile equipment comprises a program, by which it checks in connection with start-up that the SIM module attached to the terminal equipment is the appropriate one.

However, current SIM module check programs have a drawback that the SIM module check program in the mobile equipment can be altered too easily in such a manner that the mobile equipment is made operable also with other SIM modules than the one intended.

BRIEF DESCRIPTION OF THE INVENTION

An object of the invention is to provide an improved method and a device implementing the method such that unauthorized use of the device and unauthorized alteration of functions would be difficult. This is achieved by a method for protecting an electronic device which comprises an operational unit and a user-specific module and which is intended to communicate with a radio network. The method is further characterized by protecting both identity data of the operational unit and a verification key of the cryptographic method employed by a service provider with a key of the cryptographic method employed by the operational unit manufacturer; and storing the verification key of the cryptographic method employed by the operational unit manufacturer for verifying the identity data of the operational unit and the key of the cryptographic method employed by the service provider.

The invention also relates to a method for protecting an electronic device which comprises an operational unit and a user-specific module and which is intended to communicate with a radio network. Both the identity data of the operational unit and the verification key of the cryptographic method of the service provider are protected with a key of the cryptographic method of the operation unit manufacturer, and a verification key of the cryptographic method employed by the operational unit manufacturer is stored in the operational unit of the electronic device; and both the identity data of the operational unit and the identity data of the service provider are protected with a key of the cryptographic method employed by the service provider; the identity data of the operational unit and the verification key of the cryptographic method employed by the service provider is verified with the verification key of the cryptographic method employed by the operational unit manufacturer, and if the verification fails, the electronic device is at least blocked from connecting to the radio network; both the identity data of the operational unit and the identity data of the service provider are verified with the verification key of the cryptographic method employed by the service provider, which key is verified with the verification key of the cryptographic method employed by the operational unit manufacturer, and if the verification fails, the electronic device is at least blocked from connecting to the radio network; the identity data of the operational unit and the identity data of the service provider stored in the user-specific module are compared with the verified identity data of the operational unit and the verified identity data of the service provider, and if the identity data of the operational unit and the identity data of the service provider that are verified by the cryptographic method correspond to the identity data of the operational unit and the identity data of the service provider read from the user-specific module, the electronic device is started, otherwise the electronic device is at least blocked from connecting to the radio network.

The invention also relates to an electronic device, which comprises an operational unit and a user-specific module and which is arranged to communicate with the radio network. Both the identity data of the operational unit and the verification key of the cryptographic method employed by the service provider are protected with a key of the cryptographic method employed by the operational unit manufacturer, and the verification key of the cryptographic method employed by the operational unit manufacturer is stored in the operational unit of the electronic device; and both the identity data of the operational unit and the identity data of the service provider are protected with a key of the cryptographic method employed by the service provider; the electronic device is arranged to verify the identity data of the operational unit and the verification key of the cryptographic method employed by the service provider with the verification key of the cryptographic method employed by the operational unit manufacturer, and if the verification fails, the electronic device is arranged to restrict its operation at least by not connecting to the radio network; the electronic device is arranged to verify both the identity data of the operational unit and the identity data of the service provider with said verification key of the cryptographic method employed by the service provider, said key being verified with a key of the cryptographic method employed by the operational unit manufacturer, and if the verification fails, the electronic device is arranged to restrict its operation at least by not connecting to the radio network; the electronic device is arranged to compare the identity data of the operational unit and the identity data of the service provider stored in the user-specific module with the verified identity data of the operational unit and the verified identity data of the service provider; and the electronic device is arranged to start if both the identity data of the operational unit and the identity data of the service provided verified by the cryptographic method correspond to the identity data of the operational unit and the identity data of the service provider that are stored in the user-specific module, otherwise the electronic device is arranged to restrict its operation at least by not connecting to the radio network.

The preferred embodiments of the invention are disclosed in the dependent claims.

The invention is based on the idea that prior to use the manufacturer of the operational unit protects identity data of the operational unit (e.g. the identity data of the mobile equipment) and the service provider's cryptographic method of (e.g. the operator's cryptographic method) by which the identity data of the service provider and preferably also the identity data of the operational unit are protected. When the device (e.g. the terminal equipment) is used, the protected data can be verified with verification keys of the cryptographic methods and the keys of the device manufacturer and the service provider are bound to one another to form a verification chain.

Several advantages are achieved by the method and system of the invention. The solution impedes unauthorized alteration of data in the electronic device and thus ensures that the operational unit and the user-specific module are interlocked.

BRIEF DESCRIPTION OF THE DRAWINGS

In the following, the invention will be described in greater detail in connection with preferred embodiments, with reference to the attached drawings, wherein

FIG. 3 shows a terminal equipment as an example of an electronic device;

FIG. 4 shows protection measures prior to use;

FIG. 5 shows protection measures prior to use; and

DETAILED DESCRIPTION OF THE INVENTION

In particular, the present solution is applicable to verifying a SIM module check of a portable electronic device capable of operating in a radio network. One device of this kind is e.g. a radio system terminal equipment, without restricting thereto, however.

Figure 1:
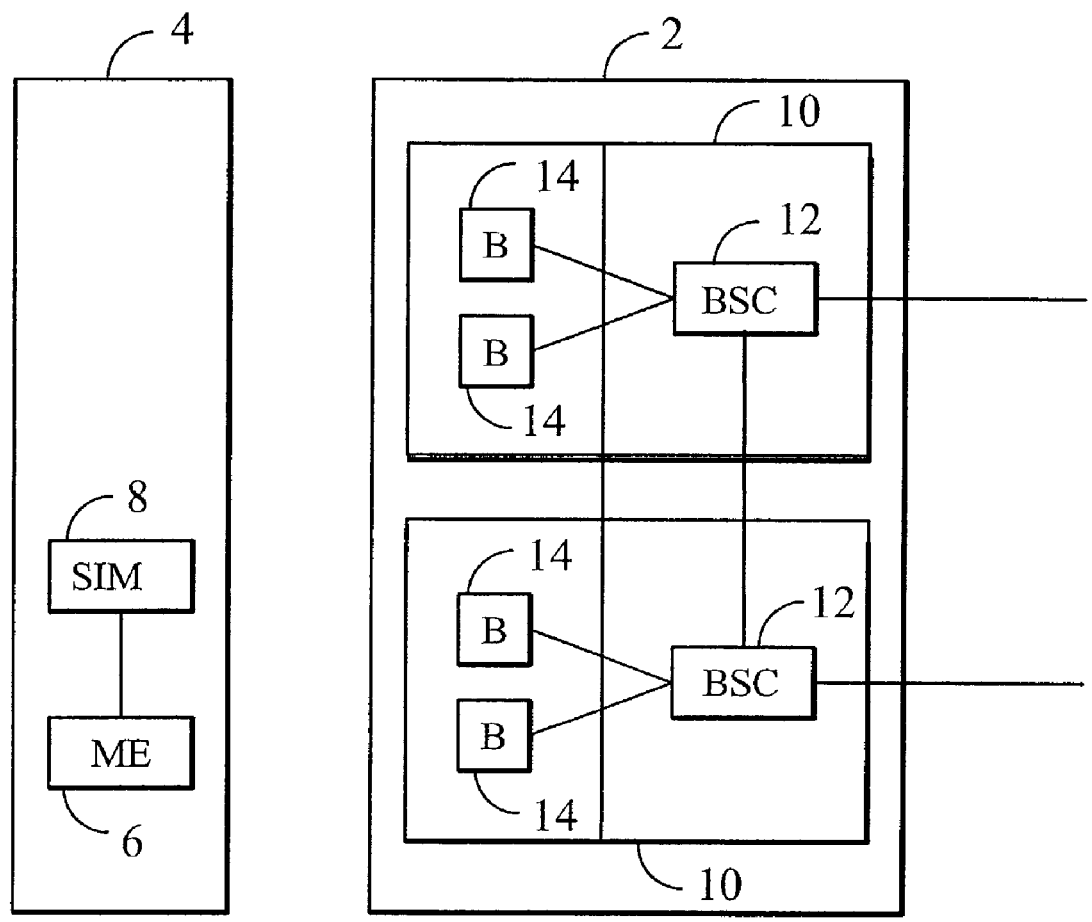
FIG. 1 shows a structure of a mobile system.

With reference to FIG. 1, a structure of a radio system is described by way of example. The radio system can be a GSM or UMTS radio system. The radio system parts include a terrestrial radio access network 2 of the mobile system and a user equipment UE 4. The user equipment 4 consists of two parts: a mobile equipment ME 6 which serves as an operational unit and whose radio terminal is used to establish a radio connection to the network 2, and a user-specific module, i.e. SIM (Subscriber Identity Module) module 8, which is a smart card that contains information on the subscriber's identity and typically performs authentication algorithms, stores encryption parameters and subscriber data.

The radio network 2 consists of radio network subsystems RNS 10, which consist of base station controllers 12 and one or more base stations 14. Each base station controller 12 administrates radio resources with the base stations connected thereto.

Figure 2:
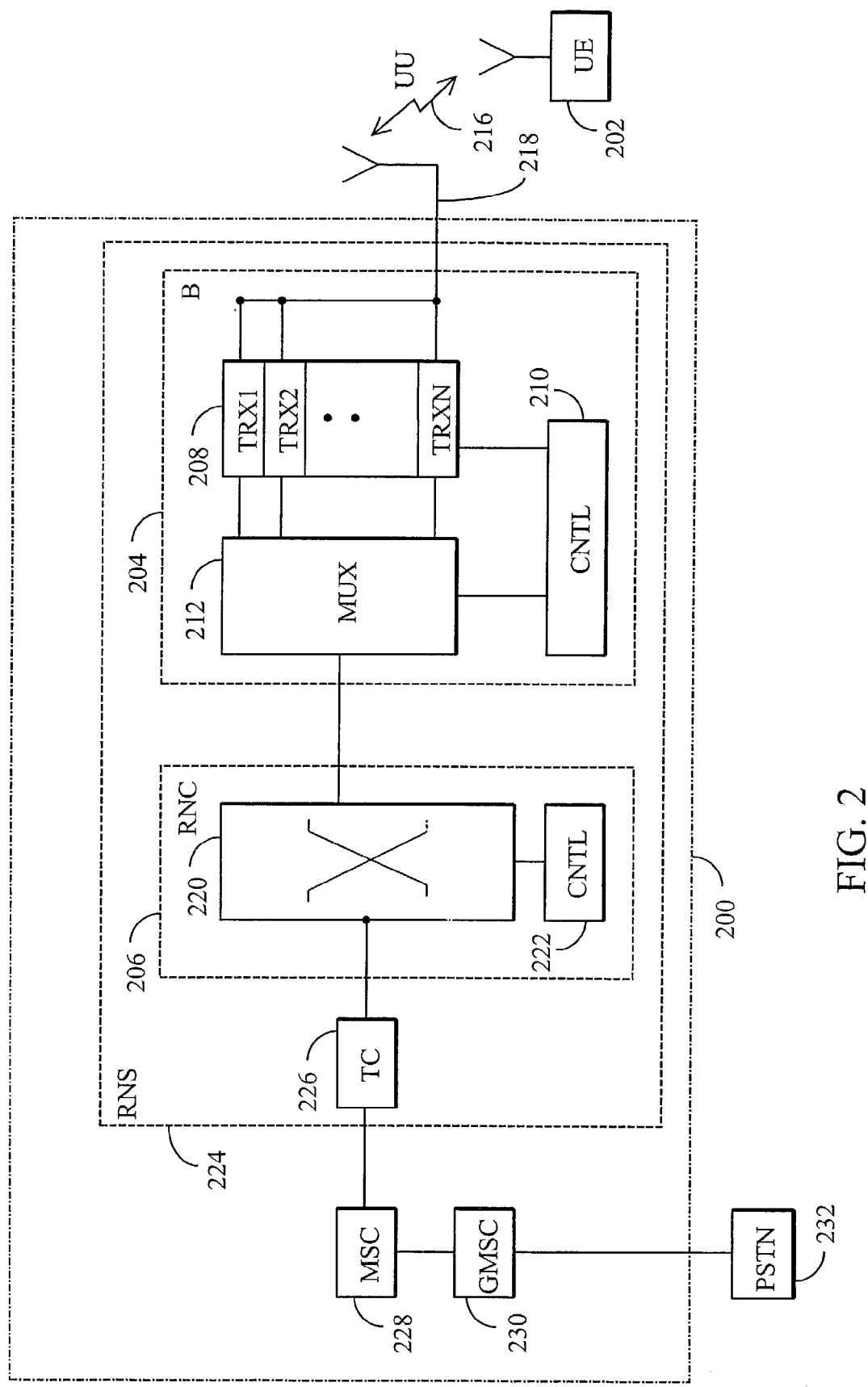
FIG. 2 shows a cellular radio system.

FIG. 1 is depicted on rather a general level, so FIG. 2 gives a more detailed example of a cellular radio system. FIG. 2 only shows the most substantial blocks, but it is apparent to a person skilled in the art that a conventional cellular radio network also comprises other functions and structures that need not be described in greater detail herein. It should also be noted that FIG. 2 only gives one example of the structure.

Thus, the cellular radio network typically comprises a fixed network infrastructure, i.e. a network part 200 which corresponds to the radio network 2 in FIG. 1, and user equipments 202 which can be fixed terminal equipments, terminal equipments located in a vehicle or portable, carry-around terminal equipments. The network part 200 comprises base stations 204. A plurality of base stations 204 are, in turn, controlled in a centralized manner by a radio network controller 206 that communicates therewith. The base station 204 comprises transceivers 408 and a multiplexer unit 212.

The base station 204 further comprises a control unit 210 which controls the operation of the transceivers 208 and the multiplexer 212. The multiplexer 212 is used to place traffic and control channels used by a plurality of transceivers 208 onto one transmission link 214.

The transceivers 208 of the base station 204 have a connection to an antenna unit 218, by which a bidirectional radio connection to the user equipment 202 is implemented. The structure of frames to be transmitted on the bidirectional connection 216 is defined system-specifically. In preferred embodiments of the invention, at least part of the signal is transmitted by using three or more transmission antennas or three or more antenna beams provided by a plurality of transmission antennas.

The radio network controller 206 comprises a group switching field 220 and a control unit 222. The group switching field 220 is used for switching speech and data and for connecting signalling circuits. The radio network subsystem 224 consisting of the base station 204 and the radio network controller 206 also comprises a transcoder 226. Generally, the transcoder 226 is located as close to a mobile switching centre 228 as possible, because speech can then be transmitted in the cellular-radio-network form between the transcoder 226 and the radio network controller 206 saving transmission capacity.

The transcoder 226 converts the different digital coding formats of speech used between the public switched telephone network and the mobile network to be mutually compatible, for instance, from the fixed network format into any cellular radio network format, and vice versa. The control unit 222 performs call control, mobility management, collecting of statistics and signalling.

FIG. 2 also shows a mobile services switching centre 228 and a gateway mobile services switching centre 230, which takes care of the mobile system connections to the outside world, in this case to the public switched telephone network 232.

FIG. 3 is now used to study a GSM-system terminal equipment as an example of the electronic device, the terminal equipment comprising a mobile equipment (blocks 200, 202, 206 to 218) as an operational unit and a SIM module as a user-specific module 204. The terminal equipment comprises a processor 200, in which the software operations of the terminal equipment are performed. For instance, the processor 200 takes care of digital signal treatment and controls the operation of other blocks. The user controls the electronic device and enters data with the terminal equipment's user interface 202 (display and keypad), and visual information, such as text and images, treated by the processor 200 is displayed to the user with the user interface. The processor 200 also checks the SIM module 204. Data, such as data related to the SIM module check, required by the processor is stored in a flash memory. The flash memory 206 is erasable, i.e. a reflash operation can be performed. The reflash operation can be performed, for instance, in conjunction with servicing. For the processor 200, the terminal equipment also comprises ROM and RAM memory 208 intended for other purposes. The memory can also be IPS (Integrity Protected Storage) memory. A codec block 210 converts the signal arriving from the processor 200 to be suitable for a loudspeaker 212, and the codec block 210 converts the signal arriving from the microphone 214 to be suitable for the processor 200. An RF block 216, in turn, converts the transmitted digital signal arriving from the processor 200 into an analog, radio-frequency signal, so that the signal can be transmitted as electromagnetic radiation via an antenna 218. Correspondingly, the radio-frequency signal received by the antenna 218 is converted to a lower frequency and is digitized in the RF block 216 prior to applying to the processor 200.

The user-specific module, in the terminal equipment a SIM module, is a smart card which comprises a microprocessor and memory. Operational unit data, personal data of the user and identification data of the user interface are stored in the memory of the SIM module. These data are e.g. in IMEI (International Mobile Equipment Identity) and IMSI (International Mobile Subscriber Identity) codes, of which the IMEI code comprises as partial codes a serial number, an assembly code and a type approval code and the IMSI code comprises as partial codes a subscriber identifier, an MNC (Mobile Network Code) and an MCC (Mobile Country Code). Therefore, if the terminal equipment has no SIM module or if the terminal equipment has an inappropriate SIM module for the mobile equipment, it is not possible to make ordinary calls with the terminal equipment, and in that case only emergency calls are possible.

One efficient way to improve the interlocking of the user-specific module and the operational unit is to use any cryptographic method known per se. In this document, encryption and cryptography refer to encrypting or signing data. Known cryptographic methods include various secret key cryptographic methods and public key cryptographic methods. The secret key cryptographic method is also referred to as symmetric cryptography, because the same key is used for both encryption and decryption. In this case, only the data encryptor and the data receiver know the secret key. The public key encryption, in turn, is called asymmetric cryptography, because data encryption is often performed with a public key, but data decryption is performed with a secret key. In the public key cryptographic method it is also possible to encrypt the data with a secret key and decrypt the data with a public key, in which case only the data encryptor knows the secret key, while the data receiver knows the public key, with which the data can be decrypted.

The public key cryptographic method can also be used for signing data, whereby the data itself is not encrypted but its authenticity, i.e correctness, can be verified. Thus, the desired data is signed with the protector's secret key that is only known to the protector. The signature is carried out by a mathematical operation between the data and the secret key, and the signature is appended to the data. When the data receiver wishes to be sure of the authenticity of the transmitted data, the receiver uses the public key in a manner known per se for checking the relation between the signature and the data. If the signature verifies the data, the data is definitely transmitted by the signer. But if the signature and the data do not correspond, the data does not originate from the signer.

A commonly used verification method of data authenticity is MAC cryptography (Message Authentication Cryptography). By a MAC algorithm together with an encryption key the data is converted into MAC data that is transmitted or supplied to a verifier together with the original, unconverted data. This can be presented by a formula $X=MAC(K,d)$, where X represents MAC data, MAC( ) represents a MAC operation, K is the encryption key and d is data. When the verifier knows the encryption key, which is also the verification key, the authenticity of the original data can be verified. The verification is performed such that the receiver converts the received data $d_r$ with the encryption key K by a MAC algorithm into MAC data $X_r$ and compares the obtained result $X_r$ with the received MAC data X. If the results match ($X_r=X$), it can be assumed that the received data is authentic. But if the results do not match ($X_r \neq X$), the received data is not authentic. Various data protection solutions are described in greater detail in the publication *Applied Cryptography*, B Schneider, second edition, 1996, which is incorporated herein as reference. The cryptographic methods used in the presented solution are known per se, and therefore they are not discussed in greater detail herein.

To interlock the operational unit and the user-specific module it is possible to perform the following protection measures that are described in FIG. 4. First, a first certificate is generated in block 300. The first certificate CERT1 can be expressed mathematically as $CERT1=Sig_D(Id_{ou}, Pk_o)$, where $Id_{ou}$ is the identity of the operational unit, $Pk_o$ is the verification key of the service provider and $SIG_D( )$ refers to protection with the key of the operational unit manufacturer. This certificate can be stored in the operational unit's memory, such as IPS memory. In that case, both the identity data of the operational unit and the verification key of the cryptographic method employed by the service provider are protected with the key of the cryptographic method employed by the operational unit manufacturer. The protection of the data and the verification key can be performed with a secret key of a public key cryptographic method, for instance, or by the MAC cryptographic method. In the public key cryptography, the key used by the manufacturer and the verification key differ from one another, because the verification key is a public key in the public key cryptographic method and the key used by the manufacturer is a secret key. When MAC cryptography is used for the protection, the verification key is always the same as the key of the cryptographic method employed by the operational unit manufacturer.

For verifying the identity data and the verification key, the verification key of the cryptographic method employed by the operational unit manufacturer is stored in the operational unit of the electronic device in block 302. In MAC cryptography, unprotected identity data, unprotected verification key and a result $X_{iK}$ obtained by a cryptographic operation are also stored in the operational unit of the electronic device.

It is also possible to combine different protection methods and to provide an electronic envelope, for instance. The identity data of the operational unit and the verification key of the service provider can first be protected utilizing symmetric encryption, and thereafter, the identity data of the operational unit and the verification key of the service provider that are protected by the symmetric encryption are further protected with a key of the public key cryptographic method or by utilizing MAC cryptography.

As shown in FIG. 5, a second certificate is generated thereafter in block 400, which may take place at or after the manufacturing stage of the operational unit or prior to bringing the operational unit into use. The second certificate CERT2 can be expressed mathematically as $CERT2=Sig_o(Id_{ou}, OP_{id})$, where $Id_{ou}$ is the identity data of the operational unit, $OP_{id}$ is the identity of the service provider and $Sig_o( )$ refers to protection with the service provider's key. In this case, both the identity data of the operational unit and the identity data of the service provider are protected with the key of the cryptographic method employed by the service provider. Also in this case, data protection can be performed either with a secret key of the public key cryptographic method or by the MAC cryptographic method. When the MAC cryptography is used, unprotected data are stored in the operational unit of the electronic device.

Figure 6:
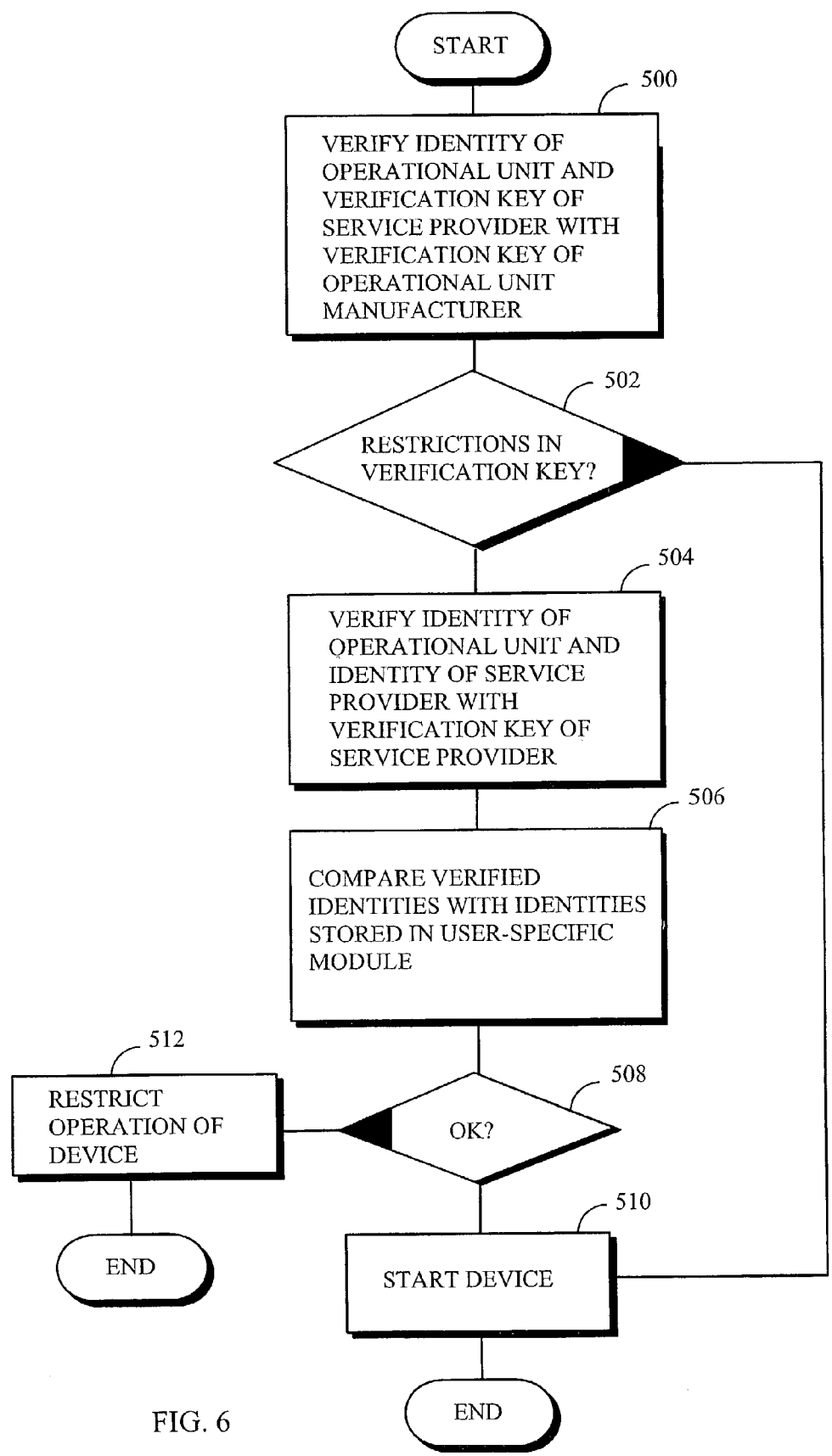
FIG. 6 shows protection measures during use.

FIG. 6 is used to study the measures which relate to the use of the electronic device. The first certificate is verified in block 500. Verification takes as long as necessary for its completion, or if verification cannot be performed or it fails, the operation of the terminal equipment is restricted at least by blocking its attachment to the radio network, whereby the terminal equipment is unable to establish a connection to the radio network. If the verification fails, it is also possible to block the operation of the electronic device completely. This applies to all verifications that are carried out in the presented solution. For verifying the first certificate, the identity data of the operational unit and the verification key of the cryptographic method employed by the service provider are verified with the cryptographic method verification key stored in the operational unit, which verification key is associated with the cryptographic method employed by the operational unit manufacturer.

In block 502, which is not substantial to the presented solution, it is checked whether the first certificate includes restrictions concerning the service provider. If the verification key of the cryptographic method employed by the service provider is a predetermined code written such that it is not the actual key of the cryptographic method, block 510 is proceeded to directly, the electronic device is started and the other steps of the method are omitted. The predetermined code confirms that the service provider leaves the mutual relation between the operational unit and the user-specific module unprotected, i.e. as far as the service provider is concerned, the electronic device is allowed to operate with any user-specific module whatsoever. If the verification key of the cryptographic method is not a predetermined code, the method proceeds step by step.

In block 502, it is also possible to carry out the following measures (not shown in FIG. 6). After verifying the identity data of the operational unit and the verification key of the cryptographic method employed by the service provider, the identity data of the operational unit stored in the user-specific module is read therefrom and this information is compared with the verified identity data of the operational unit. If the compared data do not correspond, the operation of the electronic device is blocked.

In block 504, a second certificate is verified. In particular, the identity data of the service provider is verified with the verification key of the cryptographic method employed by the service provider. At the same time it is also possible to verify the identity data of the operational unit, even though it is already verified in block 500 of FIG. 5?. The verification key of the cryptographic method of the service provider is already verified with the key of the cryptographic method employed by the operational unit manufacturer in block 500.

In block 506, at least the identity data of the service provider stored in the user-specific module is read therefrom. The identity data of the operational unit is possibly read as well. In block 508, the identity data of the service provider read from the operational unit and the identity data of the operational unit are compared with the information verified in block 504. If the identity data of the service provider verified by the cryptographic method and the identity data of the operational unit correspond with the identity data of the service provider and the identity data of the operational unit read from the user-specific module, block 510 is proceeded to and the electronic device is started. Otherwise, block 512 is proceeded to and the operation of the electronic device is blocked. When the identity data of the operational unit and the verification key of the cryptographic method employed by the service provider are protected by a public key cryptographic method, the verification can be performed with the public key of the public key cryptographic method, and the secret key corresponding to said public key has been used by the operational unit manufacturer and it is stored in the operational unit. The protection is performed by signature or by encryption. If signature is used as protection, the identity data of the operational unit and the verification key of the cryptographic method employed by the service provider are verified by checking the signature using the public key of the public key cryptographic method. But if the protection is carried out by encryption, the identity data of the operational unit and the verification key of the cryptographic method employed by the service provider is verified by decryption with the public key of the public key cryptographic method.

When the MAC cryptographic method is used for protection, a key of the MAC cryptographic method employed by the operational unit manufacturer, unprotected identity data of the operational unit and an unprotected verification key of the cryptographic method employed by the service provider are stored in the operational unit of the electronic device. In this case, the identity data of the operational unit and the verification key of the cryptographic method employed by the service provider are verified with the key of the MAC cryptographic method employed by the operational unit manufacturer. A reference MAC encryption is performed on the key of the MAC cryptographic method employed by the operational unit manufacturer and the unprotected identity data of the operational unit and the key of the cryptographic method employed by the service provider, which gives a result $X_{iKr}$. The authenticity of the information and the verification key is verified by comparing the result of the reference MAC encryption $X_{iKr}$ with the original MAC encryption result $X_{iK}$, and if the encryption results are identical ($X_{iKr}=X_{iK}$), the identity data of the operational unit and the verification key of the cryptographic method employed by the service provider are considered as verified.

Like in the case of the identity data of the operational unit and the verification key of the service provider, the identity data of the operational unit and the identity data of the service provider can be protected with a secret key of the public key cryptographic method employed by the service provider. In this case, these data are verified with the public key of the public key cryptographic method employed by the service provider, which public key is already verified with the verification key of the electronic device manufacturer. If the identity data of the operational unit and the identity data of the service provider are protected with a signature which is generated by the public key cryptographic method using the secret key of the service provider, the data are verified by checking the signature using the public key of the public key method. Alternatively, the identity data of the operational unit and the identity data of the service provider can be encrypted with the secret key of the public key cryptographic method employed by the service provider. In that case, these data are verified by decryption with the public key of the public key cryptographic method.

Like in the case of the identity data of the operational unit and the verification key of the service provider, the identity data of the operational unit and the identity data of the service provider can be protected by the MAC cryptographic method employed by the service provider, instead of the public key cryptographic method. Thus, both the identity data of the operational unit and the identity data of the service provider are verified with the service provider's MAC encryption key which is verified with the verification key of the electronic device manufacturer.

A reference MAC encryption is performed on the key of the MAC cryptographic method employed by the service provider and both the unprotected identity data of the operational unit and the unprotected user identity, which gives a result $X_{iir}$. The authenticity of the data is verified by comparing the result $X_{iir}$ of the reference MAC encryption with the result $X_{ii}$ of the original MAC encryption, and if the results are identical ($X_{iir}=X_{ii}$), the identity data of the operational unit and the identity data of the service provider are considered as verified.

In particular in connection with the second certificate the service provider's key can be generated in the following manner when the MAC cryptographic method is employed. The service provider's MAC key $K_{od}$ is generated as a pseudo-random function from a key K and the service provider's identity data $OP_{id}$, where K is the key used by the manufacturer and which is stored in the operational unit of the electronic device. Mathematically the service provider's key $K_{od}$ can be expressed as $K_{od}=prf(K, OP_{id})$, where the pseudo-random function prf is e.g. SEAL (Software-optimized Encryption Algorithm) without restricting thereto, however. In the radio system the service provider's identity data is an MNC code, for instance. When this procedure is used, the manufacturer of the operational unit need not provide a different digital key for all operational parts, but it will be sufficient that the manufacturer stores one key in all operational parts manufactured. On the other hand, the manufacturer can choose the number of different keys used, because the manufacturer can store the same or a different key in different operational units.

A third certificate CERT3 alters the second certificate and is expressed in the same way. Mathematically the third certificate CERT3 can be expressed as $CERT3=Sig_o(Id_{ou}, OP_{id})$. The third certificate allows alteration of the data given in the second certificate. For instance, the service provider's identity data is altered such that the service provider's new identity data, which is encrypted with a key of the cryptographic method employed by the service provider, is entered in the electronic device. The identity data of the operational unit can also be altered in the same manner in the same or some other connection, but in practice that is seldom necessary.

However, with the third certificate the service provider generally desires to unlock the protected locking between the operational unit and the user-specific module. In that case, a predetermined code, by which the service provider leaves the relation between the operational unit and the user-specific module unprotected, is set to be the key of the cryptographic method employed by the service provider. The third certificate can then be expressed as $CERT3=Sig_o(Id_{ou}, *)$, where * represents the predetermined code. For instance, the operator dependence of the terminal equipment can be cancelled by a radio signal, which is a text message, e-mail, etc. The service provider can transmit or enter the third certificate in the electronic device, when necessary. Large databases are thus not needed to generate the third certificate.

The identity data of the operational unit can consist of one identity or more than one identities. Each identity is generally indicated by a number sequence. For instance, in a radio system mobile equipment the identity data is indicated by an IMEI code or a serial number comprised by the IMEI code. Thus, the identity data $Id_{op}$ can be expressed as $Id_{op}$=xxxxxx–yyyyyy, where xxxxxx is the first number of the identity number sequence in the order of magnitude and yyyyyy is the last number of the identity number sequence in the order of magnitude. If xxxxxx is identical to yyyyyy, the identity data defines one identity. But if xxxxxx is different from yyyyyy, the identity data defines at least two identities and it includes all identities between xxxxxx and yyyyyy, in addition to the identities xxxxxx and yyyyyy. When the third certificate is provided in a form where the identity data of the operational unit comprises a set of individual identities, it is possible to unlock the locking between a plurality of operational units and the user-specific module at the same time, for instance. This brings an advantage that a unit-specific alteration is avoided.

It is also possible to alter the first certificate. In that case, data is transmitted to or entered in the operational unit, by which data the original verification key of the service provider is changed into another verification key. When the data is protected with the key of the operational unit manufacturer, the new key is found authentic and the new verification key becomes valid in the operational unit. In this manner the verification key can be changed into a predetermined code, by which the service provider leaves the relation between the operational unit and the user-specific module unprotected. Also this change can be carried out for more than one operational unit at the same time.

In the presented solution the electronic device is advantageously a terminal equipment in a radio system, the service provider is an operator, the service provider's identity data is one or more IMSI codes or partial codes of the IMSI code and the operational unit's identity data is one or more IMEI codes or partial codes of the IMEI code.

Even though the invention is described in the above with reference to the example of the attached drawings, it is apparent that the invention is not restricted thereto, but it can be modified in a variety of ways within the scope of the inventive idea set forth in the attached claims.

The invention claimed is:

1. A method for protecting an electronic device which comprises an operational unit and a user-specific module and which is intended to communicate with a radio network, wherein both the identity data of the operational unit and the verification key of the cryptographic method employed by the service provider being protected with a key of the cryptographic method employed by the manufacturer of the operational unit, and the verification key of the cryptographic method employed by the manufacturer of the operational unit being stored in the operational unit of the electronic device; and both the identity data of the operational unit and the identity data of the service provider being protected with a key of the cryptographic method employed by the service provider; the method comprising verifying the identity data of the operational unit and the verification key of the cryptographic method employed by the service provider with a verification key of the cryptographic method employed by the manufacturer of the operational unit, and if the verification fails, the electronic device is at least blocked from connecting to the radio network;

verifying both the identity data of the operational unit and the identity data of the service provider with the verification key of the cryptographic method employed by the service provider, which verification key is verified with the verification key of the cryptographic method employed by the manufacturer of the operational unit, and if the verification fails, the electronic device is at least blocked from connecting to the radio network;

comparing the identity data of the operational unit and the identity data of the service provider stored in the user-specific module with the verified identity data of the operational unit and the verified identity data of the service provider; and if the identity data of the operational unit and the identity data of the service provider verified by the cryptographic method correspond with the identity data of the operational unit and the identity data of the service provider read from the user-specific module, the electronic device is started, otherwise the electronic is at least blocked from connecting to the radio network.

2. A method as claimed in claim 1, if the verification key of the cryptographic method employed by the service provider is a predetermined code, by which the service provider leaves the relation between the operational unit and the user-specific module unprotected, the rest of the steps are omitted and the electronic device is started, otherwise the process continues step by step.

3. A method as claimed in claim 1, wherein the identity data of the operational unit and the verification key of the cryptographic method employed by the service provider are protected with a secret key of the public key cryptographic method employed by the manufacturer of the operational unit, the public key of the public key cryptographic method employed by the manufacturer of the operational unit being stored in the operational unit of the electronic device to serve as a verification key; the method comprising verifying the identity data of the operational unit and the key of the cryptographic method employed by the service provider with the public key of the public key cryptographic method employed by the manufacturer of the operational unit stored as the verification key.

4. A method as claimed in claim 3, wherein both the identity data of the operational unit and the verification key of the cryptographic method employed by the service provider are protected with a signature which is generated by the public key cryptographic method using the secret key of the manufacturer of the operational unit, wherein verifying the identity data of the operational unit and the key of the cryptographic method employed by the service provider by checking the signature using the public key of the public key cryptographic method as the verification key.

5. A method as claimed in claim 3, wherein both the identity data of the operational unit and the verification key of the cryptographic method employed by the service provider are encrypted with the secret key of the public key cryptographic method employed by the manufacturer of the operational unit, the method comprising verifying the identity data of the operational unit and the verification key of the cryptographic method employed by the service provider by decrypting the identity data and the verification key of the cryptographic method employed by the service provider with the public key of the public key cryptographic method serving as the verification key.

6. A method as claimed in claim 1, wherein both the identity data of the operational unit and the verification key of the cryptographic method employed by the service provider are protected by MAC cryptographic method employed by the manufacturer of the operational unit, and the key of the MAC cryptographic method employed by the manufacturer of the operational unit, the unprotected identity data of the operational unit and the unprotected verification key of the cryptographic method employed by the service provider are stored in the operational unit of the electronic device; the method comprising verifying the identity data of the operational unit and the key of the cryptographic method employed by the service provider with the MAC key of the operational unit manufacturer.

7. A method as claimed in claim 6, wherein performing a reference MAC encryption on the MAC key of the operational unit manufacturer and the unprotected identity data of the operational unit and the unprotected key of the cryptographic method employed by the service provider;

performing verification such that the result of the reference MAC encryption is compared with the original MAC encryption result, and if the encryption results are identical, the identity data of the operational unit and the verification key of the cryptographic method employed by the service provider are considered as verified.

8. A method as claimed in claim 1, wherein both the identity data of the operational unit and the identity data of the service provider are protected with the secret key of the public key cryptographic method employed by the service provider; the method comprising verifying both the identity data of the operational unit and the identity data of the service provider with the public key of the public key cryptographic method employed by the service provider serving as the verification key.

9. A method as claimed in claim 8, wherein both the identity data of the operational unit and the identity data of the service provider are protected with a signature which is generated by a public key cryptographic method using a secret key of the public key cryptographic method employed by the service provider, the method comprising verifying the identity data of the operational unit and the identity data of the service provider by checking the signature using the public key of the public key cryptographic method.

10. A method as claimed in claim 8, wherein both the identity data of the operational unit and the identity data of the service provider are encrypted with the secret key of the public key cryptographic method employed by the service provider, the method comprising verifying the identity data of the operational unit and the identity data of the service provider by decrypting the identity data and the user identity data with the public key of the public cryptographic method.

11. A method as claimed in claim 1, wherein the identity data of the operational unit and the identity data of the service provider being protected by the MAC cryptographic method employed by the service provider, the method comprising verifying both the identity data of the operational unit and the identity data of the service provider with the MAC key of the service provider serving as the verification key.

12. A method as claimed in claim 11, performing a reference MAC encryption on the MAC key of the service provider and both the unprotected identity data of the operational unit and the unprotected identity data of the service provider;

performing the protection such that the result of the reference MAC encryption is compared with the original MAC encryption result, and if the results are identical, the identity data of the operational unit and the identity data of the service provider are considered as verified.

13. A method as claimed in claim 11, generating a key $K_{od}$ of the MAC cryptographic method employed by the service provider as a pseudo-random function from the key K and the service provider's identity data $OP_{id}$, where the key K is the key of the manufacturer of the operational unit.

14. A method as claimed in claim 1, comparing the verified identity data of the operational unit with the identity data of the operational unit stored in the user-specific module after the verification of the identity data of the operational unit and the key of the cryptographic method employed by the service provider; and if the identity data of the operational unit to be compared differ from one another, the electronic device is at least blocked from connecting to the radio network.

15. A method as claimed in claim 1, altering the identity data of the service provider such that the service provider's new identity data is entered in the electronic device, which information is protected with a key of the cryptographic method employed by the service provider.

16. A method as claimed in claim 1, wherein the identity data of the operational unit comprises more than one identities.

17. A method as claimed in claim 1, wherein the electronic device is a terminal equipment of a radio system, the service provider is an operator, the identity data of the service provider is one or more IMSI codes, or IMSI code's partial codes, and the identity data of the operational unit is one or more IMEI codes, or IMEI code's partial codes.

18. An electronic device which comprises an operational unit and a user-specific module and which is arranged to communicate with a radio network, wherein both the identity data of the operational unit and the verification key of the cryptographic method employed by the service provider are protected with a key of the cryptographic method employed by the manufacturer of the operational unit, and the verification key of the cryptographic method employed by the manufacturer of the operational unit is stored in the operational unit of the electronic device; and both the identity data of the operational unit and the identity data of the service provider are protected with the key of the cryptographic method employed by the service provider;

the electronic device is arranged to verify the identity data of the operational unit and the verification key of the cryptographic method employed by the service provider with the verification key of the cryptographic method employed by the manufacturer of the operational unit, and if the verification fails, the electronic device is arranged to restrict its operation at least by not connecting to the radio network;

the electronic device is arranged to verify both the identity data of the operational unit and the identity data of the service provider with said verification key of the cryptographic method employed by the service provider, which verification key is verified with the key of the cryptographic method employed by the manufacturer of the operational unit, and if the verification fails, the electronic device is arranged to restrict its operation at least by not connecting to the radio network;

the electronic device is arranged to compare the identity data of the operational unit and the identity data of the service provider stored in the user-specific module with the verified identity data of the operational unit and the verified identity data of the service provider; and the electronic device is arranged to start if both the identity data of the operational unit and the identity data of the service provider, verified by the cryptographic method, correspond with the identity data of the operational unit and the identity data of the service provider, stored in the user-specific module, otherwise the electronic device is arranged to restrict its operation at least by not connecting to the radio network.

19. A device as claimed in claim 18, wherein the electronic device is arranged to start if the verification key of the cryptographic method employed by the service provider is a predetermined code, by which the service provider leaves the relation between the operational unit and the user-specific module unprotected.

20. A device as claimed in claim 18, wherein both the identity data of the operational unit and the verification key of the cryptographic method employed by the service provider being protected with the secret key of the public key cryptographic method of the manufacturer of the operational unit and the public key of the public key cryptographic method employed by the manufacturer of the operational unit being stored as a verification key in the operational unit of the electronic device the electronic device is arranged to verify the identity data of the operational unit and the verification key of the cryptographic method employed by the service provider with the public key of the public key cryptographic method employed by the manufacturer of the operational unit.

21. A device as claimed in claim 20, wherein both the identity data of the operational unit and the verification key of the cryptographic method employed by the service provider are protected with a signature which is generated by the public key cryptographic method using the secret key of the manufacturer of the operational unit, and the electronic device is arranged to verify the identity data of the operational unit and the verification key of the cryptographic method employed by the service provider by checking the signature using the public key of the public key cryptographic method.

22. A device as claimed in claim 20, wherein both the identity data of the operational unit and the verification key of the cryptographic method employed by the service provider are encrypted with the secret key of the public key cryptographic method employed by the manufacturer of the operational unit, and the electronic device is arranged to verify the identity data of the operational unit and the verification key of the cryptographic method employed by the service provider by decrypting the identity data and the verification key of the cryptographic method employed by the service provider with the public key of the public key cryptographic method.

23. A device as claimed in claim 18, wherein the identity data of the operational unit and the verification key of the cryptographic method employed by the service provider are protected by the MAC cryptographic method employed by the manufacturer of the operational unit, and the MAC key of the manufacturer of the operational unit, unprotected identity data of the operational unit and an unprotected verification key of the cryptographic method employed by the service provider are stored in the operational unit of the electronic device;

the electronic device is arranged to verify the identity data of the operational unit and the verification key of the cryptographic method employed by the MAC key of the manufacturer of the operational unit.

24. A device as claimed in claim 23, wherein a reference MAC encryption is performed on the MAC key used by the manufacturer of the operational unit and the unprotected identity data of the operational unit and the unprotected key of the cryptographic method employed by the service provider;

the electronic device is arranged to perform the verification such that the result of the reference MAC encryption is compared with the result of the original MAC encryption and if the results are identical, the identity data of the operational unit and the verification key of the cryptographic method employed by the service provider are verified.

25. A device as claimed in claim 18, wherein both the identity data of the operational unit and the identity data of the service provider are protected with a secret key of the public key cryptographic method of the service provider;

the electronic device is arranged to verify both the identity data of the operational unit and the identity data of the service provider with the public key of the public key cryptographic method employed by the service provider serving as the verification key.

26. A device as claimed in claim 25, wherein both the identity data of the operational unit and the identity data of the service provider are protected with a signature which is generated by the public key cryptographic method using the secret key of the service provider, and
the electronic device is arranged to verify the identity of the operational unit and the identity data of the service provider by checking the signature using the public key of the public key cryptographic method.

27. A device as claimed in claim 25, wherein both the identity data of the operational unit and the identity data of the service provider are encrypted with the secret key of the public key cryptographic method employed by the service provider, and
the electronic device is arranged to verify the identity data of the operational unit and the identity data of the service provider by decrypting the identity data and the user identity data by means of the public key of the public key cryptographic method serving as the verification key.

28. A device as claimed in claim 18, wherein the identity data of the operational unit and the identity data of the service provider being protected by the MAC cryptographic method employed by the service provider,
the electronic device is arranged to verify both the identity data of the operational unit and the identity data of the service provider with the MAC key of the service provider serving as the verification key.

29. A device as claimed in claim 28, wherein a reference MAC encryption is performed on the MAC key used by the service provider and the unprotected identity data of the operational unit and the unprotected identity data of the service provider;
the electronic device is arranged to perform the verification such that the result of the reference MAC encryption is compared with the original MAC encryption result and if the encryption results are identical, the identity data of the operational unit and the identity data of the service provider are verified.

30. A device as claimed in claim 28, wherein the electronic device is arranged to generate the key $K_{od}$ of the MAC cryptographic method employed by the service provider as a pseudo-random function from the key K and the service provider's identity data $OP_{id}$, where K is the common key of the manufacturer and the operational unit of the electronic device.

31. A device as claimed in claim 18, wherein after verifying the identity data of the operational unit and the verification key of the cryptographic method employed by the service provider
the electronic device is arranged to compare the verified identity data of the operational unit with the identity data of the operational unit stored in the user-specific module;
the electronic device is arranged to restrict its operation at least by not connecting to the radio network if the compared identity data of the operational unit differ from one another.

32. A device as claimed in claim 18, wherein for altering both the identity data of the operational unit and the identity data of the service provider the electronic device is arranged to receive both the operational unit's new identity data and the service provider's new identity data, which are protected with a key of the cryptographic method employed by the service provider.

33. A device as claimed in claim 32, wherein if the service provider desires to unlock the locking between the operational unit and the user-specific module the electronic device is arranged to receive for use as a verification key of the cryptographic method employed by the service provider, a predetermined code by which the service provider leaves the relation between the operational unit and the user-specific module unprotected.

34. A device as claimed in claim 32, wherein if the verification key of the service provider is desired to be changed, the electronic device is arranged to receive the service provider's new verification key, which is protected with the key of the cryptographic method employed by the manufacturer of the electronic device.

35. A device as claimed in claim 18, wherein the identity data of the operational unit comprises more than one identity.

36. A device as claimed in claim 18, wherein the electronic device is a radio system terminal equipment, the service provider is an operator, the identity data of the service provider is one or more IMSI codes or IMSI code's partial codes and the identity data of the operational unit is one or more IMEI codes or IMEI code's partial codes.

37. A mobile communication device which comprises an operational unit and a user-specific module and which is arranged to communicate with a radio network, wherein both the identity data of the operational unit and the verification key of the cryptographic method employed by the service provider are protected with a key of the cryptographic method employed by the manufacturer of the operational unit, and the verification key of the cryptographic method employed by the manufacturer of the operational unit is stored in the operational unit of the mobile communication device; and both the identity data of the operational unit and the identity of data of the service provider are protected with the key of the cryptographic method employed by the service provider;
the mobile communication device is arranged to verify the identity of the operational unit and the verification key of the cryptographic method employed by the service provider with the verification key of the cryptographic method employed by the manufacturer of the operational unit, and if the verification fails, the mobile communication device is arranged to restrict its operation at least by not connecting to the radio network;
the mobile communication device is arranged to verify both the identity data of the operational unit and the identity data of the service provider with said verification key of the cryptographic method employed by the service provider, which verification key is verified with the key of the cryptographic method employed by the manufacturer of the operational unit, and if the verification fails, the mobile communication device is arranged to restrict its operation at least by not connecting to the radio network;
the mobile communication device is arranged to compare the identity data of the operational unit and the identity data of the service provider stored in the user-specific module with the verified identity data of the operational unit and the verified identity data of the service provider; and
the mobile communication device is arranged to start if both the identity data of the operational unit and the identity data of the service provider, verified by the cryptographic method, correspond with the identity data of the operational unit and the identity data of the service provider, stored in the user-specific module, otherwise the mobile communication device is arranged to restrict its operation at least by not connecting to the radio network.

* * * * *